Sept. 7, 1948.　　　H. I. MANDOLF　　　2,448,610
SPOOL LOCK FOR FISHING REELS
Filed Feb. 9, 1946
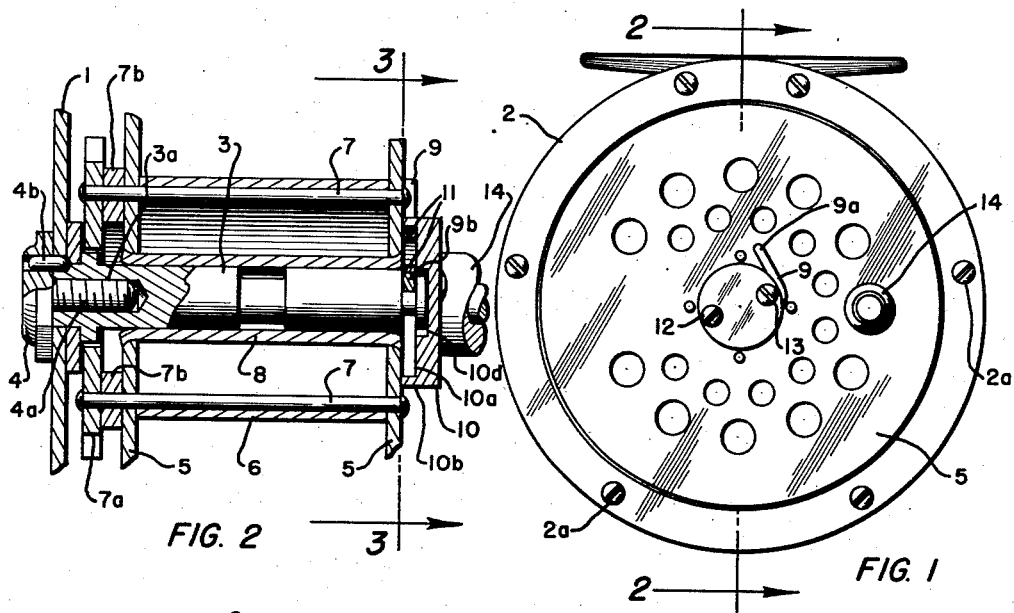
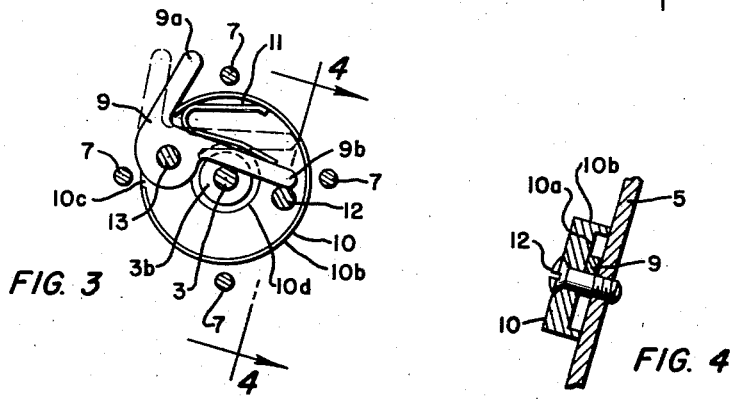
INVENTOR.
HENRY I. MANDOLF
BY
A. B. Bowman
ATTORNEY Patented Sept. 7, 1948

2,448,610

UNITED STATES PATENT OFFICE 2,448,610

SPOOL LOCK FOR FISHING REELS

Henry I. Mandolf, San Diego, Calif.

Application February 9, 1946, Serial No. 646,514

4 Claims. (Cl. 242—84.1)

1

My invention relates to a spool lock for fishing reels more particularly for use in removing the spool for changing the line thereon as desired, and objects of my invention are:

First, to provide a spool lock for fishing reels of this class which is readily released by one hand, of the operator thereof, by grasping the spool handle and engaging the latch member thereof with a finger of the same hand.

Second, to provide a spool lock for fishing reels of this class in which the latch member maintains the longitudinal end play tolerance of the reel spool in connection with the supporting shaft therefore.

Third, to provide a spool lock for fishing reels of this class which does not impose any frictional drag, resisting the rotation of the reel, in connection with the supporting shaft therefore.

Fourth, to provide a spool lock for fishing reels of this class in which the latch member is maintained by spring tension in an annular groove in the spool supporting shaft and in an engagement with a stop bolt at its extended end regulating the tolerance of the latch member with respect to the spool supporting shaft thereby providing a latch means relatively free of friction drag in connection with the spool supporting shaft and, Fifth, to provide a spool lock for fishing reels of this class which is very simple and economical of construction, efficient in its action, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of a fishing reel showing my spool lock for fishing reels in connection therewith.

Figure 2 is an enlarged fragmentary sectional view taken from the line 2—2 of Figure 1, showing parts and portions in elevation to facilitate the illustration.

Figure 3 is a transverse sectional view taken from the line 3—3 of Figure 2, and,

2

Figure 4 is a fragmentary sectional view taken from the line 4—4 of Figure 3.

Similar characters of reference refer to similar parts and portions throughout the several views of the drawing.

The frame plates 1 and 2, shaft 3, bolt 4, spool plates 5, spool drum 6, rivets 7, spool bearing 8, latch member 9, latch casing 10, latch spring 11, screws 12 and 13, and the spool handle 14, constitute the principal parts and portions of my spool lock for fishing reels.

The frame plate 1 is a disc shaped plate and the frame plate 2 is a ring shaped plate secured to the frame plate 1 by conventional spacers in connection with the screws 2a, as shown in Fig. 1 of the drawing. Secured centrally to the frame plate 1 is a shaft 3 engaged by the bolt 4 shown best in Fig. 2 of the drawings. This shaft 3 is provided with an internally screw threaded portion 3a, in which the threaded portion 4a, of the bolt 4, is positioned. The head of the bolt 4 engages the outer side of the frame plate 1 and is secured against rotation by the lock pin 4b, which extends into the frame plate 1 and the shaft 3, all as shown best in Fig. 2 of the drawings. The spool of the reel includes the disc shaped spool plates 5, held together by the rivets 7 around which the drum 6 extends and acts as a spacer for the spool plates 5. As shown in Fig. 2 of the drawings the rivets 7 extend through a drag wheel 7a secured in spaced relation to one of the spool plates by means of the spacer 7b. The spool plates 5 engage a bearing member 8, on the shaft 3, which bearing member 8 is substantially flush with the outside of the plates 5. Secured to the outermost spool plate 5, on the outer side thereof, is the latch casing 10, in which the latch member 9 is pivotally mounted on the screw 13 and in engaged relation with the screw 12, as shown best in Fig. 3 of the drawings. It will be noted that the screws 12 and 13 hold the latch casing 10 in connection with the plate 5, as shown best in Fig. 4 of the drawings. This latch casing 10 is substantially circular in form, having a cup shaped recessed portion 10a at its inner side in which the latch member 9 is positioned. The annular side well portion 10b surrounding the cup shaped recessed 10a, as shown in Fig. 3 of the drawings is provided with a cutaway portion 10c through which the outwardly extending finger lever portion 9a, of the latch member 9, extends. Shaft 3 is provided with an annular groove portion 3b, near its extending end in which the lever portion 9b, of the latch member 9, is engaged as shown best in Fig. 2 of the drawings, thus the latch member 9 maintains the longitudinal end play tolerance of the reel spool in connection with the shaft 3. The latch spring 11 engages the side well 10b surrounding the recessed portion 10a of the latch casing 10 and also engages the lever portion 9b of the latch member 9, tending to force the same into the annular groove portion 3b near the extending end of the shaft 3 as shown best in Fig. 3 of the drawings. It will be noted that the latch casing 10 is provided with an extended recessed portion 10d in which the extended end of the shaft 3 is positioned. This extended recess 10d accommodates the end of the shaft 3 outwardly of the latch member 9 which rests at the intersection of the recessed portions 10a and 10d all as shown best in Fig. 2 of the drawings. As shown in Fig. 1 of the drawings, the spool handle adjacent to the latch member 9 in convenient position for engaging the latch member 9 with one finger of the same hand used in grasping the spool handle 14, thus the lever portion 9a, of the latch member 9, is disposed in annular relation to a plane intersecting the axis of the reel handle 14 and the axis of the reel spool so that the latch member 9 may be engaged by the one finger of the operator's hand for forcing the lever portion 9a toward the spool handle 14 for pivoting the latch member 9 on the screw 13 and disengaging the lever portion 9b from the annular groove of the shaft 3.

The operation of my spool lock for fishing reels is substantially as follows:

When it is desired to remove the spool from the frame of the fishing reel the spool handle 14 is grasped by the forefinger and thumb of the operator's hand and another of the fingers of the same hand, engages a lever portion 9a, of the latch member 9, for pivoting the same on a screw 13 moving the lever portion 9b out of engagement with the annular groove portion 3b, of the shaft 3, whereupon the spool may be moved longitudinally from the shaft 3 and entirely disconnected from the frame of the fishing reel. When replacing the spool in connection with the shaft 3 the lever portion 9a, of the latch member 9, is engaged in the same manner and held against compression of the spring 11 until the lever portion 9b engages the annular groove portion 3b, of the shaft 3. When released the lever portion 9a and lever portion 9b assume the solid line position as shown in Fig. 3 of the drawings, wherein, the end of the lever portion 9b engages the screw 12 maintaining certain clearance of the shaft 3 with the lever portion 9b at the annular groove portion 3b, of the shaft 3, thus frictional drag is not present between the shaft 3 and the lever portion 9b, of the latch member 9. The spring 11 holds the latch member 9 in a solid line position as shown in Fig. 3 of the drawings, insuring positive engagement of the latch member 9 with the annular groove portion 3b, of the shaft 3, the depth of the recessed portion 10a of the latch casing 10 conforms closely to the latch member 9, thus the latch member 9 is maintained in certain position which in its engaged relation with the annular groove portion 3b, of the shaft 3, maintains longitudinal end play tolerance of the spool relatively to the shaft 3.

Though I have shown and described a particular construction, combination and arrangement of parts and portions, I do not wish to be limited to the particular construction, combination and arrangement, but desire to include in the scope of my invention the construction, combination and arrangement substantially as set forth in the appended claims.

Having thus described my invention, what I claim as new and desire to secure by Letters Patent is:

1. In a spool lock for fishing reels of the class described a combination of a frame, a shaft in connection therewith extending therefrom and provided with an annular portion circumferentially disposed about the end portion thereof, a spool on said shaft, a cup shaped latch casing secured on said spool, a pair of screws extending through said latch casing and connected with said spool in screw threaded relation therewith, a latch member pivotally mounted in connection with one of said screws and positioned in said annular portion of said shaft and engaging the other of said screws near its extending end.

2. In a spool lock for fishing reels of the class described a combination of a frame, a shaft in connection therewith extending therefrom and provided with an annular groove portion circumferentially disposed about the end portion thereof, a spool on said shaft, a cup shaped latch casing secured on said spool, a pair of screws extending through said latch casing and connected with said spool in screw threaded relation therewith, a latch member pivotally mounted in connection with one of said screws and positioned in said annular groove portion of said shaft and engaging the other of said screws near its extending end, said latch member being substantially L-shaped and having a lever portion extending outwardly substantially tangent to the outer side of said latch casing.

3. In a spool lock of fishing reels of the class described a combination of a frame, a shaft in connection therewith extending therefrom and provided with an annular groove portion circumferentially disposed about the end portion thereof, a spool on said shaft, a cup shaped latch casing secured on said spool, a pair of screws extending through said latch casing and connected with said spool in screw threaded relation therewith, a latch member pivotally mounted in connection with one of said screws and positioned in said annular groove portion of said shaft and engaging the other of said screws near its extending end, said latch member being substantially L-shaped and having a lever portion extending outwardly substantially tangent to the outer side of said latch casing, a spool handle in connection with said spool and said extending lever portion of said latch member angularly disposed to a plane passing through the axis of said spool and said spool handle.

4. In a spool lock for fishing reels of the class described a combination of a frame, a shaft in connection therewith extending therefrom and provided with an annular groove portion circumferentially disposed about the end portion thereof, a spool on said shaft, a cup shaped latch casing secured on said spool, a pair of screws extending through said latch casing and connected with said spool in screw threaded relation therewith, a latch member pivotally mounted in connection with one of said screws and positioned in said annular groove portion of said shaft and engaging the other of said screws near its extending end, said latch member being substantially L-shaped and having a lever portion extending outwardly substantially tangent to the outer side of said latch casing, a spool handle in connection with said spool and said extending lever portion of said latch member angularly disposed to a plane passing through the axis of said spool and said spool handle, said screws in connection with said latch casing disposed on opposite sides of a plane extending through the axis of said spool and said spool handle in acute angular relation therewith.

HENRY I. MANDOLF.

REFERENCES CITED

The following references are of record in the file of this patent:

UNITED STATES PATENTS

| Number | Name | Date |
|---|---|---|
| 1,714,535 | Weiss | May 28, 1929 |

FOREIGN PATENTS

| Number | Country | Date |
|---|---|---|
| 13,156 | Great Britain | June 17, 1907 |
| 391,925 | Great Britain | May 11, 1933 |